United States Patent

Wentz et al.

[11] 3,935,940
[45] Feb. 3, 1976

[54] SORTER SYSTEM INDUCTION MEANS

[75] Inventors: Edward A. Wentz, Gaithersburg; David M. Shinnick, Frederick, both of Md.

[73] Assignee: American Chain & Cable Company, Inc., Bridgeport, Conn.

[22] Filed: Jan. 29, 1975

[21] Appl. No.: 545,199

Related U.S. Application Data

[63] Continuation-in-part of Ser. No. 331,205, Feb. 9, 1973, Pat. No. 3,871,511.

[52] U.S. Cl. .................... 198/25; 198/21; 198/103
[51] Int. Cl.² ........................................ B65G 47/57
[58] Field of Search ........... 198/25, 21, 37, 38, 103, 198/211

[56] References Cited
UNITED STATES PATENTS

| | | |
|---|---|---|
| 3,151,731 | 10/1964 | Harrison et al. .................... 198/38 |
| 3,193,080 | 7/1965 | Speaker ........................... 198/30 X |
| 3,279,625 | 10/1966 | McConnell et al. ............... 198/25 X |

*Primary Examiner*—Evon C. Blunk
*Assistant Examiner*—Richard K. Thomson
*Attorney, Agent, or Firm*—Barnes, Kisselle, Raisch & Choate

[57] ABSTRACT

Articles are transferred from the delivery end of an input conveyor to a sorter conveyor for delivery to preselected destinations by a pair of rotor assemblies that are rotationally indexed between predetermined positions in sequential overlapping relation to each other. Rotation of the rotor assemblies are synchronized with operational conditions of the input and sorter conveyors.

8 Claims, 3 Drawing Figures

3,935,940

SORTER SYSTEM INDUCTION MEANS

This application is a continuation-in-part of application Ser. No. 331,205, filed Feb. 9, 1973 now U.S. Pat. No. 3,871,511.

This invention relates to the transfer or induction of hard to handle articles to a sorter conveyor.

BACKGROUND OF THE INVENTION

In connection with automated materials handling systems and equipment for warehouses, distribution centers, truck and airline terminals, and other industrial installations, troublesome problems arise with respect to relatively large and/or bulky articles such as mail sacks.

One particular source of trouble in such material handling systems occurs adjacent the receiving zone on the sorter conveyor through which coded articles are delivered to preselected destinations. At this location in the system, the motion of the articles must be variably controlled in accordance with various conditions both upstream and downstream along the path of travel as well as to accommodate time for entry of destination code data into a memory by personnel to control the sorter conveyor system. For proper transfer of the articles to the sorter conveyor, the massiveness of the articles, the wide variation in sizes thereof must also be dealt with.

It is, therefore, an important object of the present invention to provide apparatus for transferring hard to handle articles from the delivery end of a belt conveyor to a receiving zone on a sorter tray type conveyor in an automated materials handling system through which the articles are delivered to preselected destinations with sufficient pause in the travel of the articles to enable personnel to read coded information on the articles and enter the same into a memory. The foregoing objective is achieved with a maximum flow rate of articles and with minimum malfunction of the system by correlation of the transfer operation with upstream and downstream conditions along the path of travel.

In accordance with the present invention, the articles transferring apparatus includes one or more rotor assemblies which sequentially transports the articles to the sorter conveyor. Although adjacent rotors with article holding pockets for sequential transfer of articles are well known, they are generally operated continuously in a cyclically synchronized relationship. Contrary thereto, the rotor assemblies are controlled for intermittent operation in accordance with upstream and downstream conditions detected by photo-sensors, limit switches and malfunction sensing switches. The rotor assemblies are provided with vanes to interrupt gravitationally induced movement of the articles to sequentially effect pause in the travel of the articles, with an overlap in rotation of the rotors between indexed positions to obtain maximum flow density. The vanes on the rotors are axially elongated to accommodate articles of maximum length in a direction transverse to the direction of travel. Also, the vanes on at least one of the rotors adjacent the delivery end of the input conveyor form entrance and exit ramps in the indexed positions of the rotor to guide downward movement of the articles under gravitational inducement, movement being augmented by the vanes acting as paddles during rotation of the rotor between the indexed positions. Releasable disc brakes at opposite axial ends of the rotors hold the rotors against rotation in the indexed positions to absorb the impact of the massive articles against the vanes or paddles.

In one illustrated embodiment of the invention, a second rotor assembly adjacent the receiving zone of the sorter conveyor is provided with vanes that act as paddles instead of gates and are rotated in the same direction as the preceding rotor to handle articles such as mail bags that require additional inducement for movement onto the sorter conveyor.

The arrangement of a photo-sensing relay detecting articles on the entrance ramp vane of the rotor adjacent the input conveyor to initiate a sequential, overlapping rotational cycle of the rotors, renders the apparatus suitable for use with either a continuously operating or an intermittently operating input conveyor. Cam operated switches and additional photo-sensor actuated in response to rotation of the rotors provide input data for the sorter conveyor control system, produce the overlap in rotational movement of the rotors and correlate operation of the transfer apparatus with operating conditions of the input and sorter conveyors.

DESCRIPTION

Figure 1:
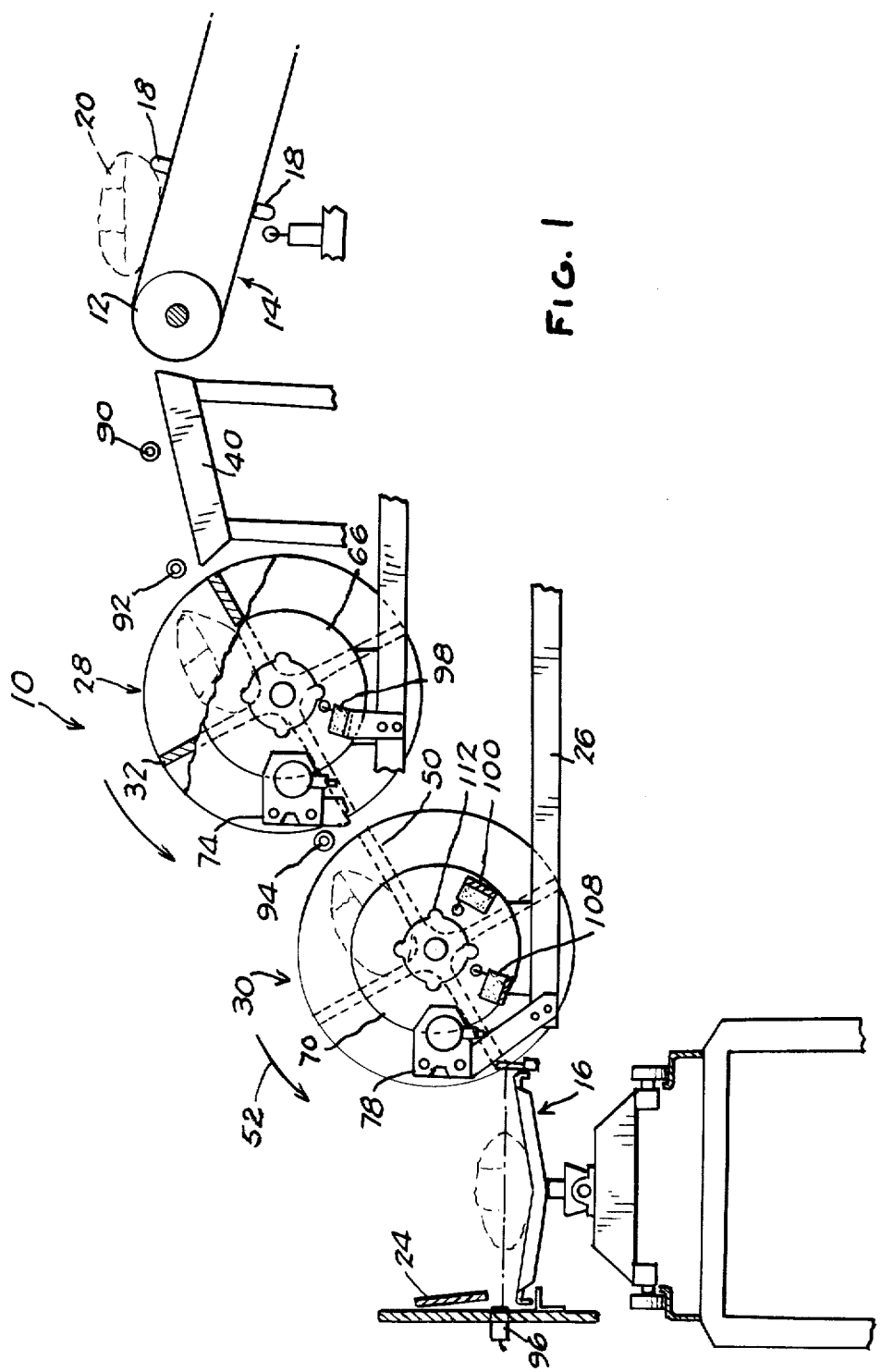
FIG. 1 is a partial side elevational view of the apparatus constructed in accordance with the present invention.
Figure 2:
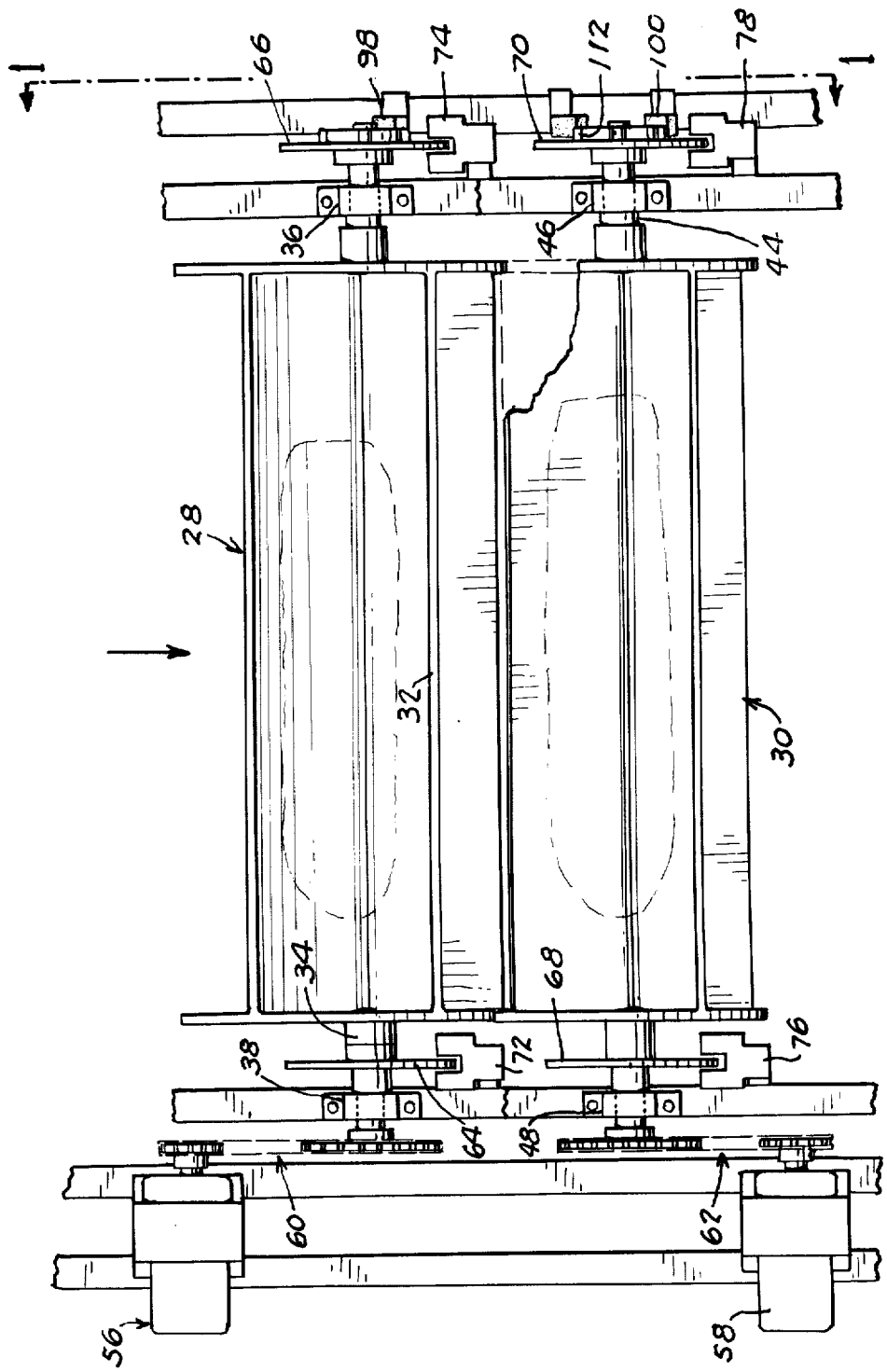
FIG. 2 is a partial side elevational view of the apparatus.

Referring now to the drawings in detail, FIGS. 1 and 2 illustrate the article transfer apparatus of the present invention generally referred to by reference numeral 10. The apparatus 10 is located between the delivery end 12 of a typical input conveyor 14 and the receiving zone of a sorter conveyor 16. The input conveyor is of the endless belt type provided with belt mounted flights 18 for movement of articles 20 at an upward incline toward the delivery end 12 from which the articles are dropped onto the transfer apparatus 10. The articles are discharged from the transfer apparatus onto a plurality of trays 22 of the sorter conveyor. A preselected number of trays 22, if necessary, to accommodate the maximum length of articles being handled, are operatively interconnected for receiving articles at the receiving zone along which the backstop 24 is located in order to deliver the articles to preselected destinations at which the interconnected trays are laterally tilted to unload the article in a manner well known to those skilled in the art. As shown in FIG. 1, the articles are conveyed by the sorter conveyor from the receiving zone in a direction perpendicular to the direction of travel of the articles from the input conveyor 14 through the transfer apparatus 10.

With continued reference to FIGS. 1 and 2, the transfer apparatus includes a frame assembly generally referred to by reference numeral 26 positioned between the conveyors 14 and 16 for rotatably supporting a pair of rotor assemblies generally referred to by reference numerals 28 and 30. The rotor assemblies are axially elongated to accommodate the maximum length of articles 20 to be handled. The rotor assembly 28 located adjacent the delivery end 12 of the input conveyor 14 is provided with vanes 32 that extend substantially the entire axial length of the rotor shaft 34 to which the vanes are connected. In the illustrated embodiment, there are four equiangularly spaced vanes 32. Also, as shown in FIG. 2, the vanes 32 extend generally in radial relation to the rotational axis of the rotor shaft which is rotatably mounted by bearing assemblies 36 and 38 fixed to the frame assembly adjacent opposite axial ends of the shaft. The rotor assembly 28 is adapted to be rotationally indexed between predetermined angular positions so that a pair of diametrically opposite vanes 32 will form or act as downwardly inclined ramps to guide movement of the articles 20 by gravitational inducement. The vane extending from the rotor assembly toward the delivery end of the conveyor forms an entrance ramp that may be bridged with the delivery end by a fixed ramp 40 as shown in FIG. 1. The opposite vane forms an exit ramp to guide movement of an article onto the trays 22.

In the illustrated embodiment, the rotor assembly 30 includes a rotor shaft 44 rotatably mounted by a pair of bearing assemblies 46 and 48 adjacent opposite axial ends thereof. The rotational axis of the rotor shaft 44 is vertically spaced below that of the rotor shaft 34 so that vanes 50 may extend therefrom. Four vanes 50 are associated with the rotor assembly 30 and extend generally in radial relation to the rotational axis of the rotor shaft 44 as shown in FIG. 1. The rotor assembly 30 is indexed 90° for each 90° of angular movement of the rotor assembly 28. The vanes 50 are rotated in a counterclockwise direction as indicated by arrows 52 in FIG. 1 for release of the articles and the rotor assembly 28 is also rotatably indexed in a counterclockwise direction as indicated by the arrows 54. Each of vanes 32, 50 vertically displaces and centrifugally augments the gravitational induced movement of the articles from the input conveyor, the vanes acting as paddles during such indexing movement.

In each position of the first rotor 28 and second rotor 30, one of the vanes of the first rotor 28 is inclined to form an entrance ramp and another vane is inclined to form an exit ramp; and one vane of the second rotor 30 is inclined to form an entrance ramp aligned with the vane of the first rotor which forms an exit ramp and another vane of the second rotor is inclined to form an exit ramp to the sorter conveyor.

As more clearly seen in FIG. 2, the rotor assemblies 28 and 30 are respectively rotationally indexed by brake motor assemblies 56 and 58 that are drivingly connected to the respective rotor assemblies by sprocket gearing 60 and 62 at one axial end of each rotor assembly. There are also four brake discs 64, 66, 68 and 70 connected to the rotor shafts 34 and 44 adjacent opposite axial ends. Each brake disc is normally engaged by a releasable brake mechanism 72, 74, 76 and 78. Brake assemblies are provided for both axial ends of each rotor assembly to not only firmly hold the rotor assembly in each of its indexed positions, but also to avoid twist of the rotor assembly in view of the large impact forces exerted thereon by the relatively massive articles being handled. Both brake devices for each rotor assembly are released simultaneously with the energization of the associated brake motor 56 and 58 by means of a fluid pressure control system. A pair of solenoid controlled valves control the engagement and disengagement of the brake devices.

FIG. 1 also illustrates the relative locations of the basic control components associated with the transfer apparatus 10. These control components include photosensing relay devices of the retro-reflective type for detecting the presence or absence of articles during travel from the delivery end of the input conveyor to the receiving zone on the sorter conveyor. The photosensing devices include an input sensor 90 located adjacent the delivery end of the input conveyor closely spaced above the fixed ramp 40 and a sensor 92 establishing a fixed sensing beam parallel to that of sensor 90 and extending parallel to the rotational axis of rotor shaft 34 closely spaced above the entrance ramp in the indexed position of the rotor assembly. Also, a sensor 94 is closely spaced ahead of the vane 50 while a sensor 96 is located at the receiving zone to establish a sensing beam across the sorter trays perpendicular to the sensing beams associated with the other sensors 90, 92 and 94. The sensor 90 is operative to signal reception of an article in the transfer assembly while the sensor 96 will prevent operation of the rotor assembly 30 until a previously delivered article has cleared the receiving zone on the sorter conveyor. The rotor assembly 30 is conditioned for rotation when an article is detected by sensor 94 entering rotor assembly 30. The rotor assembly 28, on the other hand, is conditioned for rotation after an article is detected by sensor 92 entering rotor assembly 28.

Intermittent movement of the rotor assemblies are respectively controlled by actuation of limit switches 98 and 100 fixedly mounted on the frame for engagement by the cam lobes on the rotor vanes 32 and 50, respectively. Thus, the limit switches 98 and 100 are operative through the drive motors 56 and 58 to rotationally index the rotor assemblies by 90° by limiting rotational movement. Another limit switch 108 is fixedly mounted adjacent the brake disc 70 of rotor assembly 30 for engagement by cam lobes 112 mounted on the brake disc 70. A reset switch 114 is fixedly mounted by the frame below the lower flight of the input conveyor adjacent the delivery end of the input conveyor for engagement by the flights 18 in order to control recycling of a control system associated with the transfer apparatus 10.

The control system for the article transfer apparatus is associated with the sorter memory system aforementioned through which automated operation of the sorter conveyor is achieved. Operation of the input conveyor may also be controlled or automated by a system interconnected with the sorter memory system and with the transfer control system. The sorter memory system and input conveyor control system form no part of the present invention and are briefly described in the prior parent application Ser. No. 331,205. The sorter memory system and conveyor control system are of a type that enable an operator to preselect the destination to which articles are delivered by the sorter conveyor. The coded destination of each article which is placed on the input conveyor may be read by the operator at any convenient location prior to arrival of the article at the receiving zone of the sorter conveyor. The coded destination information is entered into the sorter memory by the operator through a keyboard. Only then will the article transfer apparatus be conditioned for operation by an output from the memory system applied to a synchronizing circuit section of the control system. The synchronizing circuit section is interconnected with the first rotor drive control circuit and the second rotor drive control circuit through which synchronized operation of the paddle and gate rotor assemblies 28 and 30 are effected. Power for rendering the apparatus operative is supplied to the control circuits through a start circuit which also energizes the article sensing circuits associated with the sensors 90, 92, 94 and 96 aforementioned. The synchronizing circuit is also interconnected with the article sensing circuits and the input conveyor control system to which outputs are also supplied from the article sensing circuits. Input data to the sorter memory system is derived from the limit switches aforementioned through the drive control circuits and from the article sensing circuits.

Figure 3:
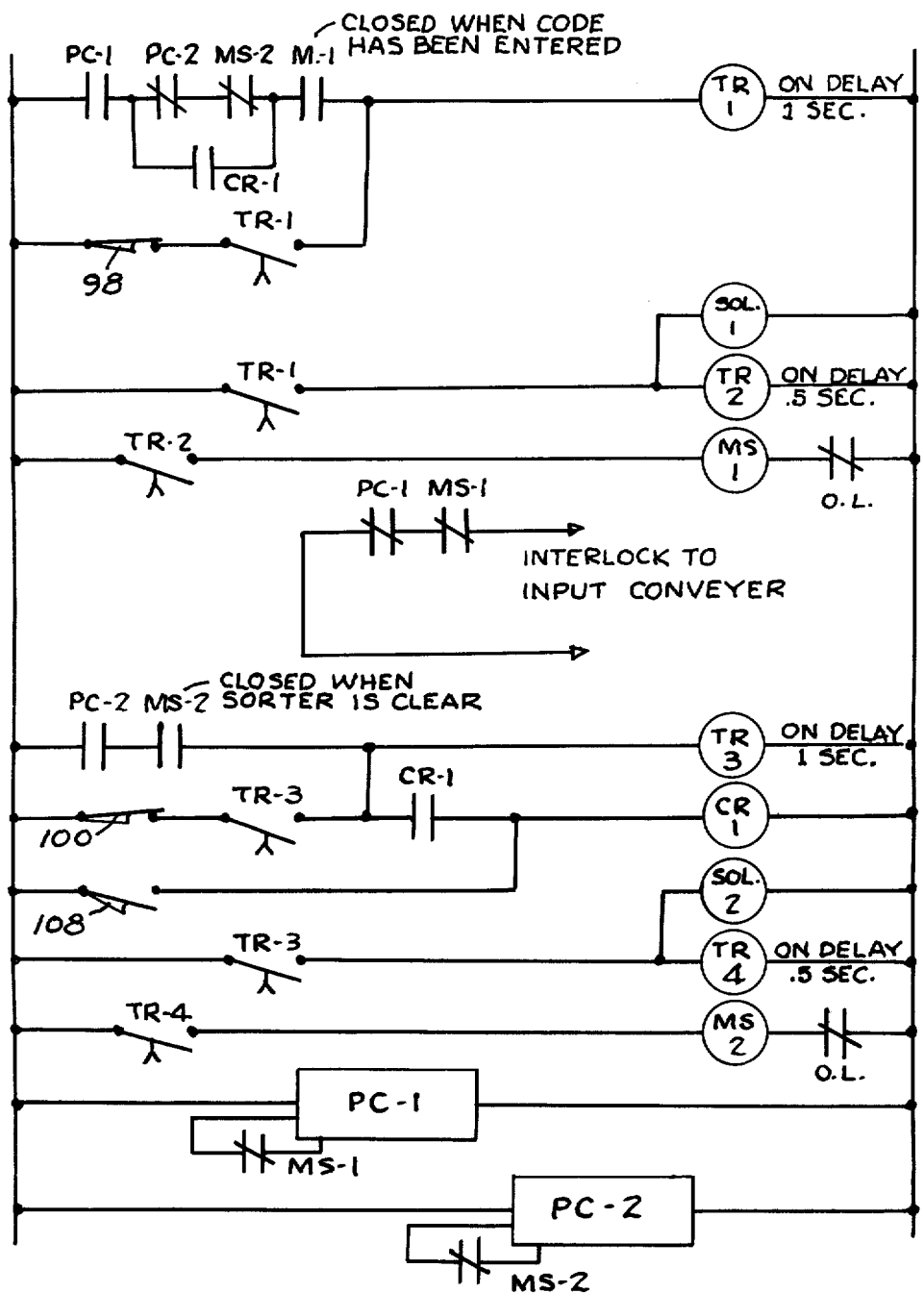
FIG. 3 is a wiring diagram of the control system.

FIG. 3 illustrates the electrical wiring associated with the transfer control system with which the various limit switches and photo-sensing relays are associated. A start circuit, not shown, is also associated with a speed sensing control component through which operation of the transfer apparatus is prevented until the sorter conveyor has attained a proper operational speed. Air pressure for engagement of the brake devices must also be available before the transfer apparatus is operated. Accordingly, air pressure sensing control component is provided for this purpose to prevent operation of the transfer apparatus until sufficient operating pressure is available.

The destination code number on the article being conveyed by the input conveyor toward the paddle rotor 28 is read by the operator and entered into the memory. When the coded input is stored, the memory produces an output to energize the code storage relay coil M-1. Before the first paddle rotor 28 can rotate by energization of motor starter MS-1, the sensor 92 must sense an article entering paddle rotor 28 to actuate contact PC-1 and close contacts PC-1 in series with the coil of time delay relay TR-1. This time delay allows the articles to settle in the pocket of paddle rotor 28 before any action will occur. Relay CR-1 allows paddle rotor 28 to start its rotation to send an article to paddle rotor 30 before paddle rotor 30 reaches its home position. Limit switch 108 actuates relay CR-1. Time delay relay TR-2 allows the brake associated with paddle rotor 28 to release before starting the motor for rotating paddle 28. Limit switch 98 functions to reset the circuit when the paddle rotor 28 is returned to its home position. Time delay relay TR-3 permits a sufficient time delay to permit the article to settle in the paddle rotor 30 before any action will occur. Before the second paddle rotor 30 can rotate, sensor 94 must sense an article entering the paddle rotor 30 to actuate control PC-2 and close contacts PC-2. Time delay relay TR-4 allows the brake associated with the paddle rotor 30 to release before starting the motor for rotating paddle 30. Limit switch 108 functions to reset the circuit when the paddle 30 is returned to its home position.

We claim:

1. The combination comprising
    an input conveyor,
    a sorter conveyor having means along the path thereof for discharging articles from the conveyor to predetermined zones along the path of the conveyor,
    and means for transferring articles from the input conveyor to the sorter conveyor comprising
    first rotor means having a plurality of vanes defining article receiving pockets,
    means for rotatably mounting said first rotor means between said input conveyor and said sorter conveyor about a generally horizontal axis parallel to a portion of the path of the sorter conveyor,
    drive means operatively connected to said rotor means for intermittently rotating said first rotor means between successive indexed positions,
    said successive indexed positions including a first position and a successive second position,
    said first position being such that a vane of one pocket forms an inclined entrance ramp,
    said second position being such that the adjacent vane of the same pocket defines an exit ramp,
    second rotor means having a plurality of vanes defining article receiving pockets,
    means for rotatably mounting said second rotor means between said first rotor means and said sorter conveyor about a generally horizontal axis parallel to a portion of said sorter conveyor and parallel to the axis of said motor means,
    drive means operatively conneted to said second rotor means for intermittently rotating said second rotor means in the same direction as said first rotor means between successive indexed positions,
    said second rotor means having vanes which successively cooperate with said receiving ramp to define a receiving pocket for an article transferred from said first rotor means,
    said first position being such that a vane on one pocket is aligned with the exit ramp formed by the vane of said first pocket,
    said second position of said second rotor means being such that the adjacent vane of the same pocket defines an exit ramp,
    said drive means driving each said rotor means at a rate such that said vane forming an entrance ramp lifts an article being transferred from said first position to said second position and augments the gravitational movement of the article to said second position such that the article moves off of the vane that is acting as an exit ramp.

2. The combination set forth in claim 1 including synchronizing means for stopping the input conveyor when a pocket of the first rotor means is not in the first position and is not empty for receiving an article from said input conveyor, for conditioning said first rotor means for rotation only when said pocket defined by said second rotor means and said receiving ramp is empty for receiving an article, and for conditioning said second rotor means for rotation only when a predetermined portion of the sorter conveyor is empty for receiving an article.

3. The combination set forth in claim 2 including operational control means connected to the synchronizing means for producing overlapping motion of the rotor means and one of the conveyors to increase the flow rate of articles between said conveyors.

4. The combination set forth in claim 1 including brake means on each said rotor means cooperating with said drive means for holding said rotor means in the aforementioned predetermined indexed positions.

5. The combination comprising
    an input conveyor,
    a sorter conveyor having means along the path thereof for discharging articles from the conveyor to predetermined zones along the path of the conveyor,
    and means for transferring articles from the input conveyor to the sorter conveyor comprising
    first rotor means having four vanes defining article receiving pockets, means for rotatably mounting said first rotor means between said input conveyor and said sorter conveyor about a generally horizontal axis parallel to a portion of the path of the sorter conveyor, drive means operatively connected to said rotor means for intermittently rotating said first rotor means in one direction for bringing a pocket successively from a first to a second position, a third position and then the first position, said first position being such that a vane of each pocket forms an inclined entrance ramp, said second position being such that the adjacent vane of the same pocket defines an exit ramp, second rotor means, means for rotatably mounting said second rotor means between said first rotor means and said sorter conveyor about a generally horizontal axis parallel to a portion of said sorter conveyor and parallel to the axis of said rotor means, drive means operatively connected to said second rotor means for intermittently rotating said second rotor means in the same direction as said first rotor means from a first to a second, a third and a fourth position, said second rotor means having four diametrically opposed vanes which successively cooperate with said receiving ramp to define a receiving pocket for an article transferred from said first rotor means, said first position of said second rotor means being such that a vane of each pocket thereof is aligned with the vane of said first rotor means forming an exit ramp, said drive means driving each said rotor means at a rate such that said vane forming an entrance ramp lifts an article being tansferred from said first position to said second position and aguments the gravitational movement of the article to said second position such that the article moves off of the vane that is acting as an exit ramp, said second position of said second rotor means being such that a vane of the same pocket defines an exit ramp.

6. The combination set forth in claim 5 including synchronizing means for stopping said input conveyor when the pocket is not in the first position, is not empty for receiving an article from said input conveyor, for conditioning said first rotor means for rotation only when said pocket defined by said second rotor means and said receiving ramp is empty for receiving an article, and for conditioning said second rotor means for rotation only when a predetermined portion of the sorter conveyor is empty for receiving an article.

7. The combination set forth in claim 6 including operational control means connected to the synchronizing means for producing overlapping motion of the rotor means and one of the conveyors to increase the flow rate of articles between said conveyors.

8. The combination set forth in claim 5 including brake means on each said rotor means cooperating with said drive means for holding said rotor means in the aforementioned predetermined indexed positions.

* * * * *